United States Patent [19]
Lee

[11] Patent Number: 6,093,273
[45] Date of Patent: Jul. 25, 2000

[54] MANUFACTURING PROCESS OF METAL FOIL CARD

[75] Inventor: Edmond Mun Hang Lee, Hong Kong, The Hong Kong Special Administrative Region of the People's Republic of China

[73] Assignees: Margaret K. Lee, Alhambra, Calif.; Treasure Jewelery Manufacturing Co., Chai-Wan, The Hong Kong Special Administrative Region of the People's Republic of China

[21] Appl. No.: 09/112,396

[22] Filed: Jul. 8, 1998

[51] Int. Cl.$^7$ ............................... B31B 1/64; B44C 1/28; C09J 5/06; G09F 3/18; B44F 9/00

[52] U.S. Cl. .................. 156/230; 156/233; 156/240; 156/241; 156/247; 156/289; 156/257; 156/60; 156/61; 156/62; 156/63; 428/13; 40/661

[58] Field of Search ..................... 156/250, 283, 156/240, 241, 247, 277, 289, 60, 61, 62, 63, 257; 428/13, 14; 40/124.06, 586, 601

[56] References Cited

U.S. PATENT DOCUMENTS 5,120,589  6/1992  Morikawa et al. ................. 428/76

*Primary Examiner*—Richard Crispino
*Assistant Examiner*—J. A. Lorengo
*Attorney, Agent, or Firm*—Raymond Y. Chan; David and Raymond

[57] ABSTRACT

The present invention relates to a process of manufacturing a metal foil card having a metal surface by integrally attaching a transparent plastic laminating sheet to one side of the metal foil card as thin as 0.01 mm to 1 mm to form a plastic supporting layer, so that the tactile impression of the metal can be retained. Moreover, the metal foil is supported and reinforced by a plastic supporting layer so as to reduce the thickness of the expensive metal while providing better flexibility. The metal foil card is more easier to be cut or folded than a metal having the same thickness.

38 Claims, 4 Drawing Sheets

MANUFACTURING PROCESS OF METAL FOIL CARD

FIELD OF THE PRESENT INVENTION

The present invention relates to a process of manufacturing metal foil card for producing metal foil card product that provides a thin metal surface supported and reinforced by a plastic supporting layer, so as to reduce the thickness of the expensive metal by the plastic supporting layer while providing better flexibility and physical property.

BACKGROUND OF THE PRESENT INVENTION

Expensive metal such as gold, white gold or silver is utilized as the raw material of various decorative and practical products. In fact, some credit cards and decorative articles are made in golden color in order to emphasize their noble value. Thus, it is valuable to develop the technique of manufacturing actual gold cards with relative low cost for those noble cards, such as golden credit card, VIP membership card, birthday card, and festival card, etc.

However, due to the soft nature of pure gold, the pure gold or silver cards and decorative articles are not durable. In addition, in order to reduce the cost as much as possible, the preferred thickness of the valuable metal foil is from 0.01 mm to 1 mm which is similar to or even thinner than the thickness of a piece of paper. But, the thin metal foils made of gold, white gold or silver unlike the rigid papers may easily be folded with wrinkles and rolled up to form a coil.

U.S. Pat. No. 5,702,554 that was issued to the inventor of the present invention on Dec. 31, 1997, successfully solves the above problems by providing a process of laminating gold foil which enables a soft and very thin gold with thickness less than 1 mm to be laminated with transparent plastic sheets on both sides to form gold foil card without air bubbles formed therebetween and scrapes formed on the gold foil surfaces.

Although the U.S. Pat. No. 5,702,554 provides a durable gold foil card that is specifically excellent to be used as the raw material for producing credit cards or VIP cards, when the gold foil card is used as the raw material of decorative articles, it still has a drawback that the excellent tactile impression of gold is sheltered by the plastic layers integrally attached on both sides of the gold foil. It will substantially degrade the decoration or display value. However, it seems impossible to merely laminate one side of the thin metal foil by the prior lamination process.

SUMMARY OF THE PRESENT INVENTION

It is thus a first object of the present invention to provide a process of manufacturing a metal foil card with a metal surface, so that the tactile impression of the metal can be retained. Moreover, one side of the metal foil is supported and reinforced by a plastic supporting layer so as to reduce the thickness of the expensive metal while providing better flexibility and physical property.

A further object of the present invention is to provide a manufacturing process of metal foil card, which enables a plastic supporting layer integrally attached, such as laminated, to just one side of a metal foil as thin as 0.01 mm to 1 mm.

Another object of the present invention is to provide a metal foil card product which comprises a thin metal foil and a plastic supporting layer integrally attached to one side of the metal foil. Therefore, the metal foil card product still contains a metal surface to retain the tactile impression of metal. Moreover, the soft nature of the thin metal foil is reinforced and supported by the plastic supporting layer, so that the metal foil card can provide flexible and durable features for further production process for producing decorative articles.

In order to achieve the above objects, the present invention provides a manufacturing process of metal foil card which comprises the following steps:

(a) Press a metal piece to form a thin metal foil piece and cut the metal foil piece to a predetermined size and shape.

(b) Overlap the metal foil piece with a cover sheet.

(c) Place the overlapped metal foil piece and cover sheet between a first and a second plastic laminating sheet each having a size larger than the metal foil piece.

(d) Heat and press the two plastic laminating sheets with the metal foil piece and the cover sheet positioned therebetween simultaneously until an outer surface of the metal foil piece is integrally attached to an interior surface of the first plastic laminating sheet and an outer surface of the cover sheet is integrally attached to an interior surface of the second plastic laminating sheet, so that a rigid laminated card is formed.

(e) Cut the laminated card along the edges of the cover sheet, so that the cover sheet having the outer surface integrally attached with the second plastic laminating sheet is able to be separated from the metal foil piece having the outer surface integrally attached with the first plastic laminating sheet to form a metal foil card having a metal surface and a transparent plastic surface.

In addition, an additional sanding process can be operated after the above step (a), which comprises the steps of:

(1) placing the metal foil piece between a pair of plastic sanding mold sheets having a size larger than the metal foil piece, wherein each of the two plastic sanding mold sheets has an inner sanded surface; and (2) pressing the two plastic sanding mold sheets onto the two surfaces of the metal foil piece respectively by pressing the two plastic sanding mold sheets toward each other, wherein the pair of plastic sanding mold sheets with the metal foil piece therebetween are placed between two plastic molds on a hydraulic press, and the two plastic molds coaxially are driven toward each other to press on the pair of plastic sanding mold sheets, wherein the pressing force applied thereto presses the inner sanded surfaces evenly onto the two surfaces of the metal foil piece due to an elastic and flexible nature of the plastic sanding mold sheets to form two sanded surfaces respectively on the metal foil piece.

DETAILED DESCRIPTION OF THE PREFERRED EMBODIMENT

Figure 1:
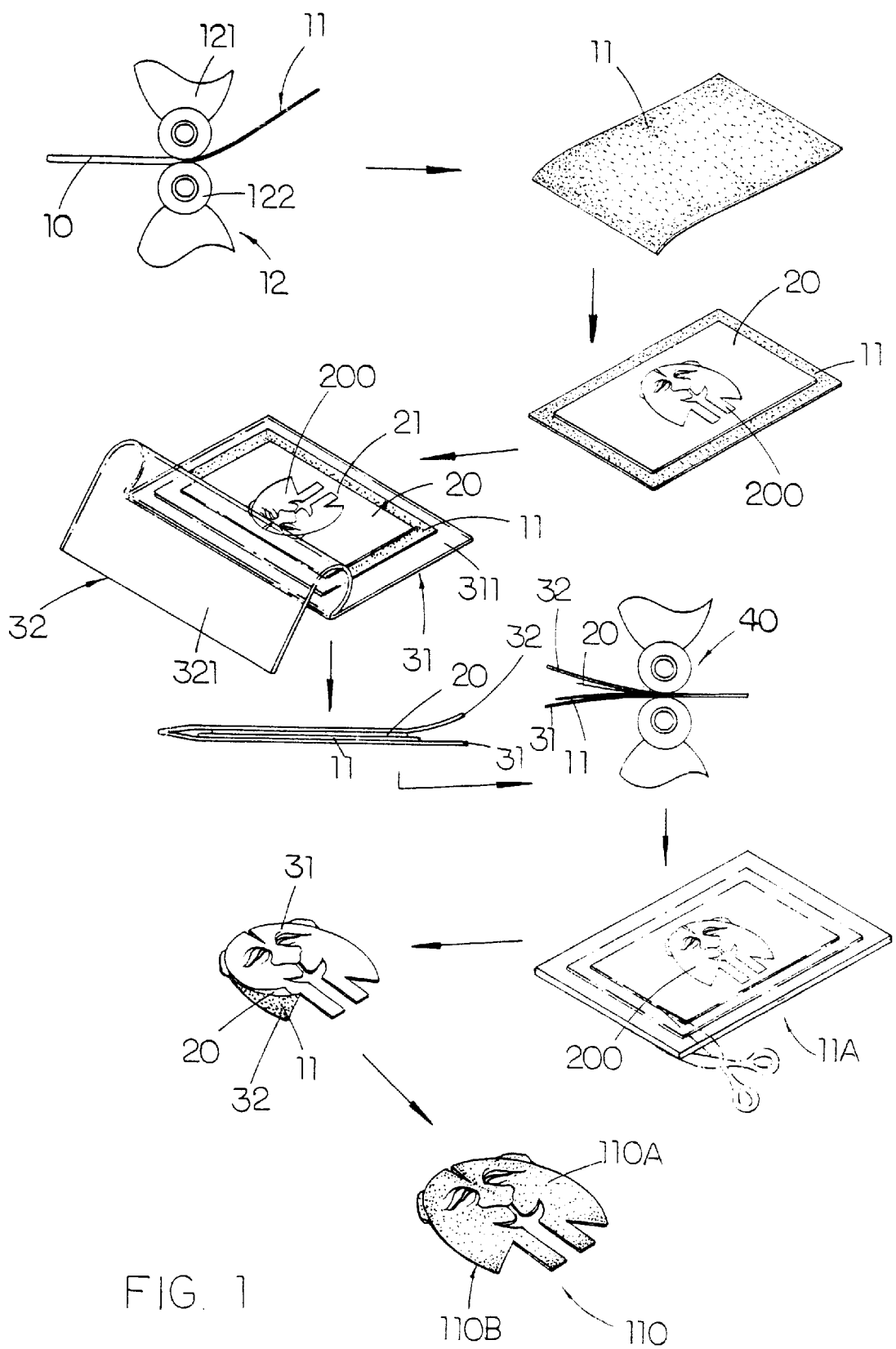
FIG. 1 is a perspective diagram of various steps of the process of manufacturing a metal foil card according to a first preferred embodiment of the present invention.
Figure 2:
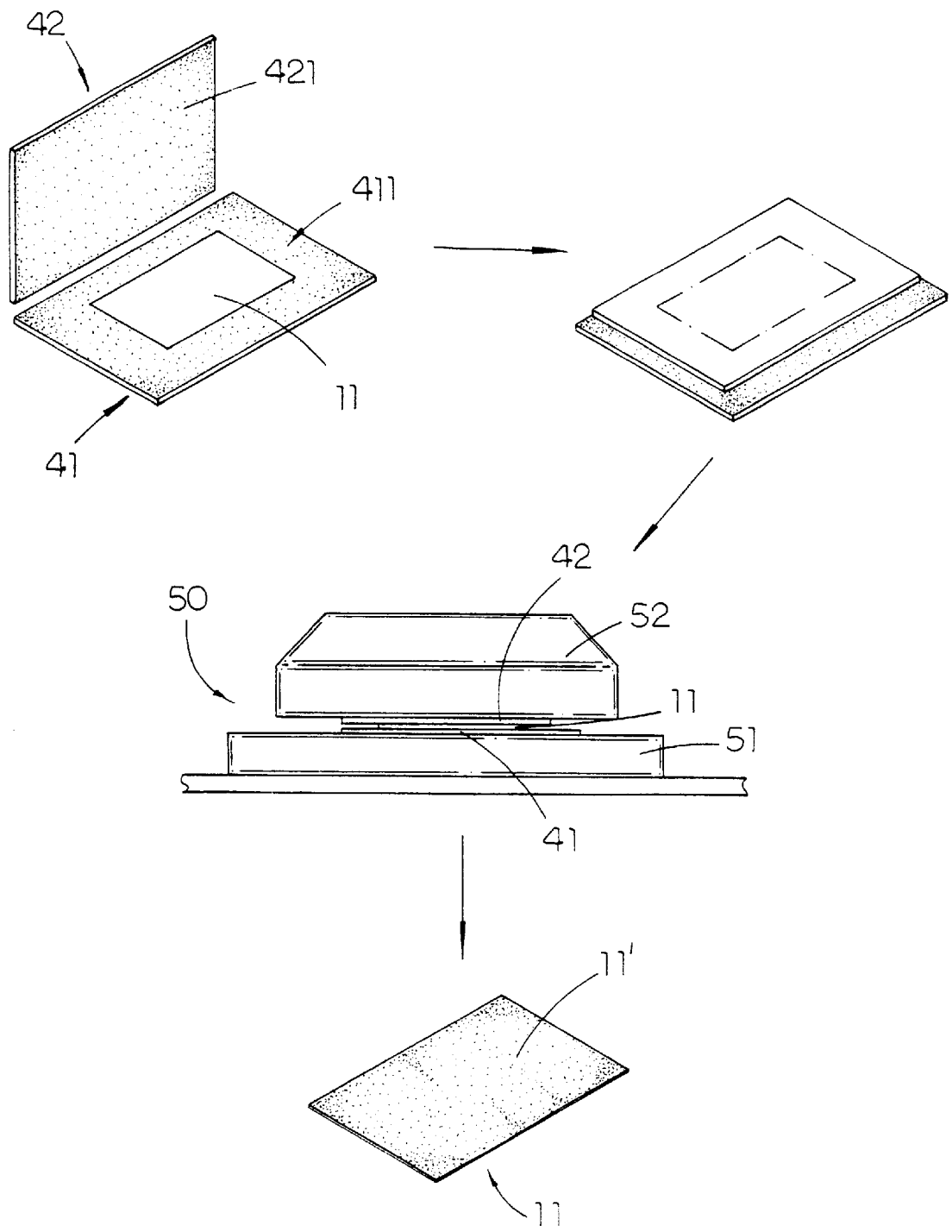
FIG. 2 is a perspective diagram of an additional sanding process for the process of manufacturing a metal foil card according to the above first preferred embodiment of the present invention.

Referring to FIGS. 1 and 2 of the drawings, a manufacturing process of metal foil card according to a first preferred embodiment of the present invention comprises the following steps:

(1) Valuable metal piece such as pure gold, pure white gold, 14 K or 24 K gold or white gold, or silver, etc. can be used as the raw material of the present invention. In order to reduce the material cost as much as possible, as shown in FIG. 1, the metal piece 10 is pressed as thin as possible to form a metal foil piece 11 by means of a rolling machine 12. According to the current technology, for example a pure gold piece can be pressed to form a thin gold foil piece having a thickness as thin as 0.01 mm to 1 mm.

The rolling machine 12 generally comprises two rollers 121, 122 parallelly aligned and driven to rotate in opposite direction so as to press the rectangular soft metal piece 10 to reduce its thickness. A predetermined thickness of the metal foil piece 11 is gradually pressed by various rolling machines 12 having different gap distance between the two rollers 121, 122.

Apply heat to the thin metal foil piece 11 having a thickness more than 1 mm so as to soften its surfaces for feeding to another roller machine 12 with smaller gap distance. Thus, the thin metal foil piece 11 can be heated and pressed again and again by various rolling machines with gradually decreased gap distance until the average thickness of the thin and soft metal foil piece becomes 0.01 mm to 1 m in thickness. Such very thin metal foil piece 11 is utilized as the raw material of metal foil card, since the thinner the metal foil is used, the cost of the metal foil card according to the present invention can be minimized.

(2) Overlap the metal foil piece 11 with a cover sheet 20. In other words, the cover sheet 20 is flatly placed on the metal foil piece 11. The cover sheet 20 can be a regular paper having a design drawn or printed thereon. The design may comprises wordings, a drawing, a figure, or a combination of the above. According to the first embodiment, an exploded Chinese mask FIG. 200 is printed on an outer side of the cover sheet 20 while an inner side of the cover sheet 20 is fully in contact with the metal foil piece 11.

(3) Place the overlapped metal foil piece 11 and the cover sheet 20 between a first and a second plastic laminating sheet 31, 32 each having a size larger than the metal foil piece 11.

(4) Heat and press the two plastic laminating sheets 31, 32 with the metal foil piece 11 and the cover sheet 20 positioned therebetween simultaneously until an outer surface of the metal foil piece 11 is integrally attached to an interior surface 311 of the first plastic laminating sheet 31 and an outer surface 21 of the cover sheet 20 is integrally attached to an interior surface 321 of the second plastic laminating sheet 32, so that a rigid laminated card 11a is formed.

According to the first embodiment of the present invention, this step is carried by feeding the first and second plastic laminating sheets 31, 32 with the metal foil piece 11 and the cover sheet 20 therebetween into a laminating machine 40 in predetermined speed for applying heat of predetermined temperature to the first and second plastic laminating sheets 31, 32 for a specific period of time. The feeding speed, the laminating temperature and the pressure applied are depend on the thickness of the first second plastic laminating sheet 31 and the second plastic laminating sheet 32 which is approximately the thickness of the metal foil card going to manufacture. The thicker of the first and second plastic laminating sheets 31, 32, the lower the feeding speed and the higher the laminating temperature are applied.

(5) Cut the laminated card 11a along the edges of the cover sheet 20, so that the cover sheet 20 having the outer surface 21 integrally attached with the second plastic laminating sheet 32 is able to be separated from the metal foil piece 11 having the outer surface integrally attached with the first plastic laminating sheet 31 to form a metal foil card 110 having a metal surface 110a and a transparent plastic surface 110b.

As shown in FIG. 1, according to the first embodiment of the present invention, the user may directly cut the laminated card 11a along the contour of the mask FIG. 200 provided on the cover sheet 20. Accordingly, the metal foil card 110 is directly shaped as the mask FIG. 200. The user may fold and form a decorating Chinese mask article having a metal surface, so that the tactile impression of the metal can be retained. Moreover, the plastic laminating sheet 31, which is integrally attached to one side of the very thin and soft metal foil piece 11, forms a plastic supporting layer to support and reinforce the metal foil piece 11. For example, if a gold foil piece as thin as 0.01 mm to 1 mm is used, the overall thickness of the gold foil card so made is increased by the plastic supporting layer while one side of the gold foil card retains the tactile impression of the gold. In order words, the customer may spend the less expense to obtain a decoration article or other products having the valuable impression and the touching feeling of pure gold.

In view of the above disclosed manufacturing steps, the metal foil card 110 produced consists of the thin metal foil piece 11 having a thickness of 0.01 mm to 1 mm and the plastic laminating sheet 31 integrally attached to one side of the metal foil piece 11 to support and reinforce the metal foil piece 11. It is worth to mention that an additional unexpected result is achieved according to the present invention that, the metal foil card of the present invention can more easily be cut and folded than a piece of metal with the same thickness. Therefore, it also facilitates the production process of an artistic or decorative product made of sheet metal.

In addition, an additional sanding process can be operated after the above step (a) since during the pressing step of the metal piece 10 which is pressed to form the thin metal foil piece 11 by the rollers 121, 122, the smooth surfaces of the metal foil piece 11 may be scratched by the steel made hard rollers 121, 122 to form some scrapes thereon. Such unwanted defective scrapes on the surfaces of the metal foil piece 11 are better eliminated before laminating with the plastic coating. In addition, the smooth surfaces of the metal foil piece 11 would be more difficult to laminate with the plastic laminating sheets than a rough surface. Therefore, in order to enable the integral and firm attachment of the metal foil surface with the transparent plastic laminating sheet 31, the additional sanding process can be applied, as shown in FIG. 2, which comprises the steps of:

(a) placing the metal foil piece 11 between a pair of plastic sanding mold sheets 41, 42 having a size larger than the metal foil piece 11, wherein each of the two plastic sanding mold sheets 41, 42 has an inner sanded surface 411, 421; and (b) pressing the two plastic sanding mold sheets 41, 42 onto the two surfaces of the metal foil piece 11 respectively by pressing the two plastic sanding mold sheets 41, 42 toward each other, wherein the pair of plastic sanding mold sheets 41, 42 with the metal foil piece 11 therebetween are placed between two plastic molds 51, 52 on a hydraulic press 50, and the two plastic molds 51, 52 coaxially are driven toward each other to press on the pair of plastic sanding mold sheets 41, 42, wherein the pressing force applied thereto presses the inner sanded surfaces 411, 421 evenly onto the two surfaces of the metal foil piece 11 due to an elastic and flexible nature of the plastic sanding mold sheets 41, 42 to form two sanded surfaces 11' respectively on the metal foil piece 11. The application of the two plastic molds 51, 52 can prevent direct damage to the valuable steel molds of the hydraulic press 50 by sudden enormous pressing and compact force.

Figure 3:
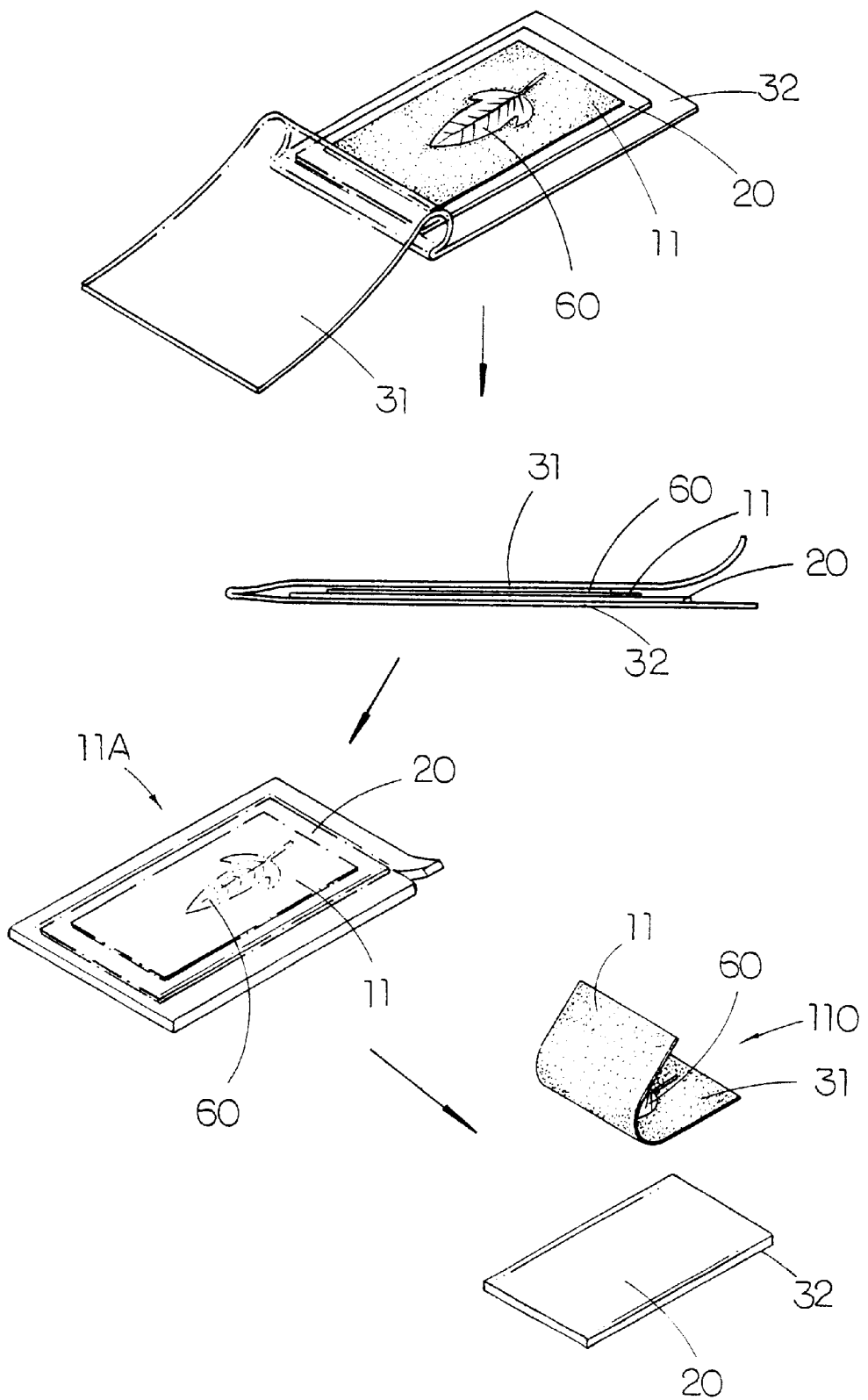
FIG. 3 is a perspective diagram of various steps of the process of manufacturing a metal foil card according to an alternative mode of the above first preferred embodiment of the present invention.

Referring to FIG. 3, an alternative mode of the above first preferred embodiment which of the present invention is illustrated, wherein a paper made blank cover sheet 20 without drawing or figure is used, which is placed on top of the second plastic laminating sheet 32.

In step (2) and step (3), the metal foil piece 11 is also placed on the cover sheet 20. However, an intermediate article 60 in sheet form, such as a leaf or another metal foil piece made of different material, is placed on top of the metal foil piece 11 before overlapping the transparent first plastic laminating sheet 31. Therefore, the intermediate article 60 is positioned between the metal foil piece 11 and the first plastic laminating sheet 31.

After processing the steps (3) and (4), a laminated card 11a having the intermediate article 60 integrally provided therein is formed. The laminated card 11a is then processed the above step (5) for cutting the laminated 11a along the edges of the metal foil piece 11 therein as disclosed above, so that the metal foil card 110 is formed and separated from the cover sheet 20 that is attached to the second plastic laminating sheet 32, wherein the metal foil card 110 so produced further consists of the intermediate article 60 integrally formed between the metal foil piece 11 and the second plastic laminating sheet 31.

Figure 4:
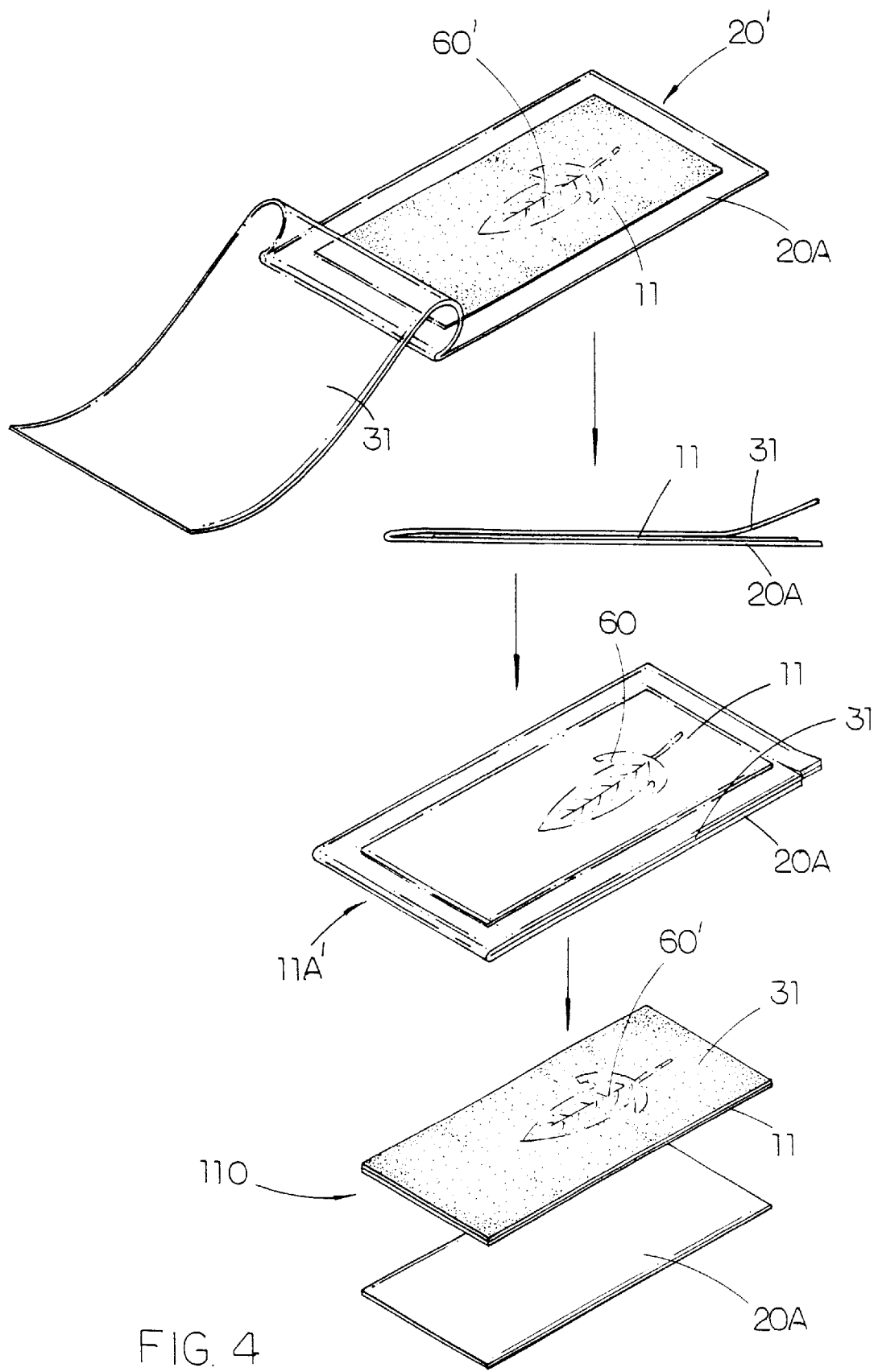
FIG. 4 is a perspective diagram of various steps of the process of the manufacturing a metal foil card according to a second preferred embodiment of the present invention.

Referring to FIG. 4, a second preferred embodiment of the present invention is illustrated, which is similar to the above first preferred embodiment. The major different between the first and the second embodiment is that the second plastic laminating sheet 32 and the step (2) in the first embodiment is eliminated in the second embodiment, and that, in step (3), the metal foil piece 11 is placed between a transparent plastic laminating sheet 31 and a special thermal resisting cover sheet 20' which is made of a sheet of paper having at least a smooth coating surface 20a and a size larger than the metal foil piece 11. The metal foil piece 11 is flatly placed on the smooth coating surface 20a of the cover sheet 20' and the plastic laminating sheet 31 is overlapped on the metal foil piece 11. After processing the step (4), a laminated card 11a' is formed. The user may then process the step (5) to cut the laminated card 11a' along the edges of the metal foil piece 11 to form the metal foil card 110. Moreover, similar to the above alternative mode of the first embodiment, in step (2), an intermediate article 60' can also be placed between the metal foil piece 11 and the plastic laminating sheet 31 so that the intermediate article 60' would be integrally provided in the metal foil card 110.

What is claimed is:

1. A manufacturing process of metal foil card, comprising the steps of:

(a) pressing a metal piece to form a thin metal foil piece and cutting said metal foil piece to a predetermined size and shape;

(b) overlapping said metal foil piece with a cover sheet;

(c) placing said overlapped metal foil piece and said cover sheet between a first and a second plastic laminating sheet each having a size larger than said metal foil piece, wherein at least said first plastic laminating sheet is made of transparent plastic material;

(d) heating and pressing said two plastic laminating sheets with said metal foil piece and said cover sheet positioned therebetween simultaneously until an outer surface of said metal foil piece is integrally attached to an interior surface of said first plastic laminating sheet and an outer surface of said cover sheet is integrally attached to an interior surface of said second plastic laminating sheet, so that a rigid laminated card is formed; and (e) cutting said laminated card along said edges of said cover sheet, wherein said metal foil piece having said outer surface integrally attached with said first plastic laminating sheet is separated from said cover sheet having said outer surface integrally attached with said second plastic laminating sheet to form a metal foil card having a metal surface and a transparent plastic surface.

2. A manufacturing process of metal foil card, as recited in claim 1, further comprising an additional sanding process after the step (1), which comprises the steps of:

placing said metal foil piece between a pair of plastic sanding mold sheets having a size larger than said metal foil piece, wherein each of said two plastic sanding mold sheets has an inner sanded surface; and pressing said two plastic sanding mold sheets onto said two surfaces of said metal foil piece respectively by pressing said two plastic sanding mold sheets toward each other, wherein said pair of plastic sanding mold sheets with said metal foil piece therebetween are placed between two plastic molds on a hydraulic press, and said two plastic molds coaxially are driven toward each other to press on said pair of plastic sanding mold sheets, wherein said pressing force applied thereto presses said inner sanded surfaces evenly onto said two surfaces of said metal foil piece due to an elastic and flexible nature of said plastic sanding mold sheets to form two sanded surfaces respectively on said metal foil piece.

3. A manufacturing process of metal foil card, as recited in claim 1, wherein said metal foil piece has a thickness of 0.01 mm to 1 mm.

4. A manufacturing process of metal foil card, as recited in claim 2, wherein said metal foil piece has a thickness of 0.01 mm to 1 mm.

5. A manufacturing process of metal foil card, as recited in claim 3, wherein said metal piece is pressed as thin as possible to form a metal foil piece by means of at least a rolling machine which comprises two rollers parallelly aligned and driven to rotate in opposite direction so as to press said metal piece to reduce the thickness thereof.

6. A manufacturing process of metal foil card, as recited in claim 4, wherein said metal piece is pressed as thin as possible to form a metal foil piece by means of at least a rolling machine which comprises two rollers parallelly aligned and driven to rotate in opposite direction so as to press said metal piece to reduce the thickness thereof.

7. A manufacturing process of metal foil card, as recited in claim 3, wherein said cover sheet has a design provided thereon.

8. A manufacturing process of metal foil card, as recited in claim 4, wherein said cover sheet has a design provided thereon.

9. A manufacturing process of metal foil card, as recited in claim 5, wherein said cover sheet has a design provided thereon, and in step (e), said laminated card is cut along a contour of said design.

10. A manufacturing process of metal foil card, as recited in claim 6, wherein said cover sheet has a design provided thereon, and in step (e), said laminated card is cut along a contour of said design.

11. A manufacturing process of metal foil card, as recited in claim 3, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

12. A manufacturing process of metal foil card, as recited in claim 4, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

13. A manufacturing process of metal foil card, as recited in claim 5, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

14. A manufacturing process of metal foil card, as recited in claim 6, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

15. A manufacturing process of metal foil card, as recited in claim 9, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

16. A manufacturing process of metal foil card, as recited in claim 10, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

17. A manufacturing process of metal foil card, as recited in claim 3, wherein, in step (c), an intermediate article in sheet form is positioned between said metal foil piece and said first plastic laminating sheet, therefore said metal foil card so produced in step (e) also consists the intermediate article integrally provided therein.

18. A manufacturing process of metal foil card, as recited in claim 4, wherein, in step (c), an intermediate article in sheet form is positioned between said metal foil piece and said first plastic laminating sheet, therefore said metal foil card so produced in step (e) also consists the intermediate article integrally provided therein.

19. A manufacturing process of metal foil card, as recited in claim 13, wherein, in step (c), an intermediate article in sheet form is positioned between said metal foil piece and said first plastic laminating sheet, therefore said metal foil card so produced in step (e) also consists the intermediate article integrally provided therein.

20. A manufacturing process of metal foil card, as recited in claim 14, wherein, in step (c), an intermediate article in sheet form is positioned between said metal foil piece and said first plastic laminating sheet, therefore said metal foil card so produced in step (e) also consists the intermediate article integrally provided therein.

21. A manufacturing process of metal foil card, comprising the steps of:
   (a) pressing a metal piece to form a thin metal foil piece and cutting said metal foil piece to a predetermined size and shape;
   (b) overlapping said metal foil piece with a thermal resisting cover sheet which has a size larger than said metal foil piece;
   (c) placing a transparent plastic laminating sheet on said metal foil piece, wherein said plastic laminating sheet has a size larger than said metal foil piece, so that said metal foil piece is positioned between said cover sheet and said plastic laminating sheet;
   (d) heating and pressing said plastic laminating sheet and said cover paper with said metal foil piece positioned therebetween simultaneously until one side of said metal foil piece is integrally attached to an interior surface of said plastic laminating sheet to form a laminated card; and
   (e) cutting said laminated card along said edges of said cover sheet, said cover sheet having said outer surface integrally attached with said second plastic laminating sheet being separated from said cover sheet to form a metal foil card having a metal surface and a transparent plastic surface.

22. A manufacturing process of metal foil card, as recited in claim 21, further comprising an additional sanding process after the step (1), which comprises the steps of:
   placing said metal foil piece between a pair of plastic sanding mold sheets having a size larger than said metal foil piece, wherein each of said two plastic sanding mold sheets has an inner sanded surface; and
   pressing said two plastic sanding mold sheets onto said two surfaces of said metal foil piece respectively by pressing said two plastic sanding mold sheets toward each other, wherein said pair of plastic sanding mold sheets with said metal foil piece therebetween are placed between two plastic molds on a hydraulic press, and said two plastic molds coaxially are driven toward each other to press on said pair of plastic sanding mold sheets, wherein said pressing force applied thereto presses said inner sanded surfaces evenly onto said two surfaces of said metal foil piece due to an elastic and flexible nature of said plastic sanding mold sheets to form two sanded surfaces respectively on said metal foil piece.

23. A manufacturing process of metal foil card, as recited in claim 21, wherein said metal foil piece has a thickness of 0.01 mm to 1 mm.

24. A manufacturing process of metal foil card, as recited in claim 22, wherein said metal foil piece has a thickness of 0.01 mm to 1 mm.

25. A manufacturing process of metal foil card, as recited in claim 23, wherein said metal piece is pressed as thin as possible to form a metal foil piece by means of at least a rolling machine which comprises two rollers parallelly aligned and driven to rotate in opposite direction so as to press said metal piece to reduce the thickness thereof.

26. A manufacturing process of metal foil card, as recited in claim 24, wherein said metal piece is pressed as thin as possible to form a metal foil piece by means of at least a rolling machine which comprises two rollers parallelly aligned and driven to rotate in opposite direction so as to press said metal piece to reduce the thickness thereof.

27. A manufacturing process of metal foil card, as recited in claim 25, wherein said cover sheet has a design provided thereon, and in step (e), said laminated card is cut along a contour of said design.

28. A manufacturing process of metal foil card, as recited in claim 26, wherein said cover sheet has a design provided thereon, and in step (e), said laminated card is cut along a contour of said design.

29. A manufacturing process of metal foil card, as recited in claim 23, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

30. A manufacturing process of metal foil card, as recited in claim 24, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

31. A manufacturing process of metal foil card, as recited in claim 25, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

32. A manufacturing process of metal foil card, as recited in claim 26, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

33. A manufacturing process of metal foil card, as recited in claim 27, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

34. A manufacturing process of metal foil card, as recited in claim 28, wherein, in step (d), said first and second plastic laminating sheets with said metal foil piece and said cover sheet therebetween are fed into a laminating machine in predetermined speed for applying heat of predetermined temperature to said first and second plastic laminating sheets for a specific period of time.

35. A manufacturing process of metal foil card, as recited in claim 23, wherein, in step (c), an intermediate article in sheet form is positioned between said metal foil piece and said first plastic laminating sheet, therefore said metal foil card so produced in step (e) also consists the intermediate article integrally provided therein.

36. A manufacturing process of metal foil card, as recited in claim 24, wherein, in step (c), an intermediate article in sheet form is positioned between said metal foil piece and said first plastic laminating sheet, therefore said metal foil card so produced in step (e) also consists the intermediate article integrally provided therein.

37. A manufacturing process of metal foil card, as recited in claim 33, wherein, in step (c), an intermediate article in sheet form is positioned between said metal foil piece and said first plastic laminating sheet, therefore said metal foil card so produced in step (e) also consists the intermediate article integrally provided therein.

38. A manufacturing process of metal foil card, as recited in claim 34, wherein, in step (c), an intermediate article in sheet form is positioned between said metal foil piece and said first plastic laminating sheet, therefore said metal foil card so produced in step (e) also consists the intermediate article integrally provided therein.

* * * * *